United States Patent [19]

Komuro

[11] Patent Number: 4,641,293

[45] Date of Patent: Feb. 3, 1987

[54] CASSETTE TAPE PLAYER COMBINED WITH A RADIO RECEIVER WHICH HAS MULTIPLE PUSH BUTTONS SUCH THAT THE STOP PUSH BUTTON CAN BE USED TO TURN OFF EITHER THE CASSETTE TAPE PLAYER OR THE RADIO RECEIVER

[75] Inventor: Toshio Komuro, Kawasaki, Japan

[73] Assignee: Sony Corporation, Tokyo, Japan

[21] Appl. No.: 575,861

[22] Filed: Feb. 1, 1984

[30] Foreign Application Priority Data

Feb. 8, 1983 [JP] Japan ................................ 58-20328

[51] Int. Cl.⁴ .................................................. G11B 31/00
[52] U.S. Cl. ........................................ 369/6; 360/137; 200/5 E; 369/7; 369/12
[58] Field of Search ...................... 369/6–12; 360/137; 200/5 B–E, 159 R, 328

[56] References Cited

U.S. PATENT DOCUMENTS

| | | | |
|---|---|---|---|
| 2,831,075 | 4/1958 | Dunke et al. ................... | 200/5 E |
| 2,935,577 | 5/1960 | Dunke et al. ................... | 200/5 E |
| 3,517,140 | 6/1970 | Bailey et al. .................... | 200/5 E |
| 3,899,795 | 8/1975 | Watanabe ........................ | 369/12 |
| 4,031,334 | 6/1977 | Kimura et al. .................. | 369/7 |
| 4,109,115 | 8/1978 | Yamamoto ...................... | 369/10 |
| 4,147,898 | 4/1979 | Tozune et al. .................. | 369/7 |

FOREIGN PATENT DOCUMENTS 0127943 8/1982 Japan .................................. 360/137

*Primary Examiner*—Raymond F. Cardillo
*Assistant Examiner*—Hoa T. Nguyen
*Attorney, Agent, or Firm*—Hill, Van Santen, Steadman & Simpson

[57] ABSTRACT

A cassette tape player is combined with a radio receiver and has a plurality of player control buttons used for selecting the operation mode of the tape playing mechanism and, a radio control button used for operating the radio signal receiving device, and a stop button used for stopping either the tape playing mechanism or the radio signal receiving device, wherein one of the player control buttons or radio control button can be switched and the operating condition either one of the tape playing mechanism or the radio signal receiving device can to be released by manipulating the stop button.

5 Claims, 14 Drawing Figures

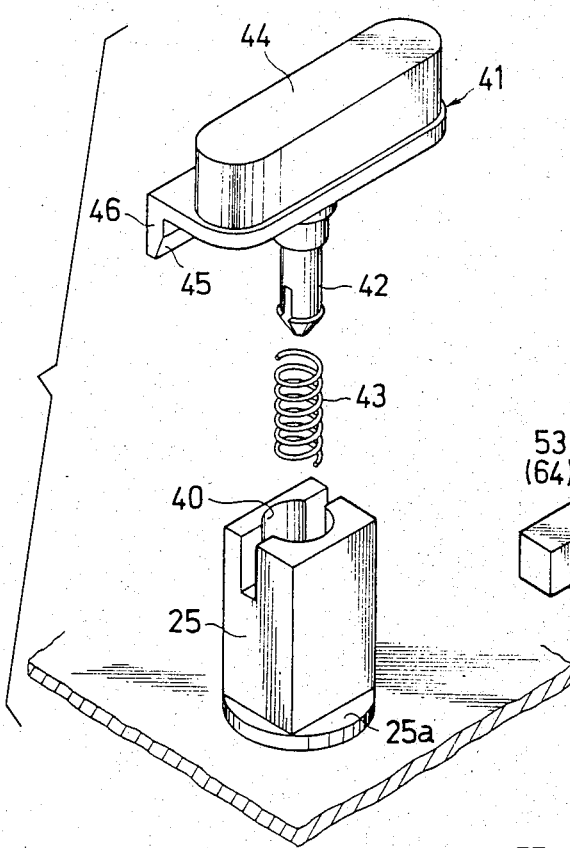
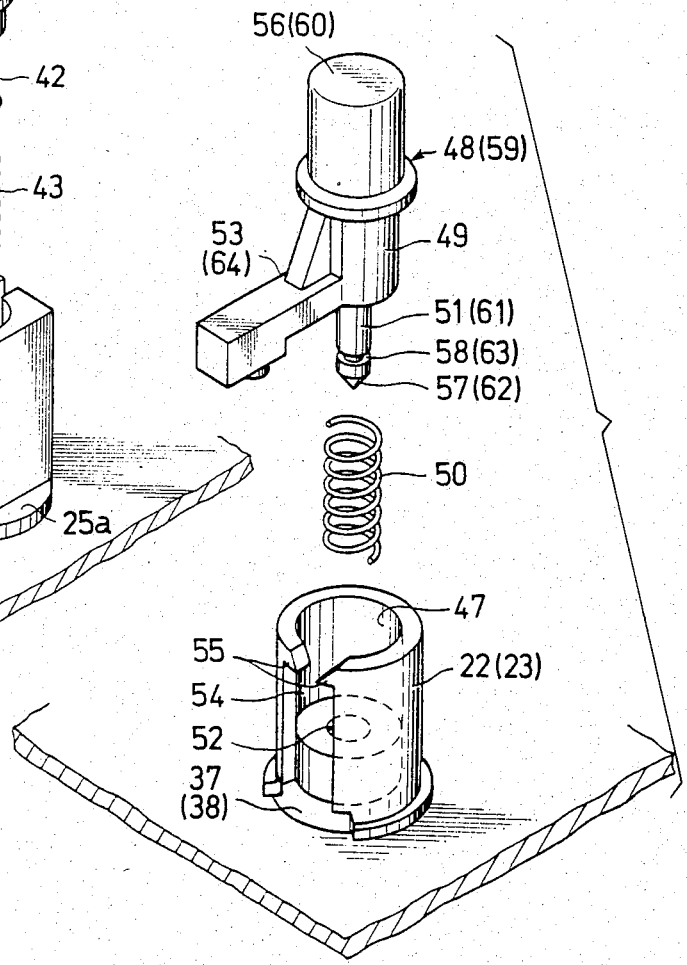

CASSETTE TAPE PLAYER COMBINED WITH A RADIO RECEIVER WHICH HAS MULTIPLE PUSH BUTTONS SUCH THAT THE STOP PUSH BUTTON CAN BE USED TO TURN OFF EITHER THE CASSETTE TAPE PLAYER OR THE RADIO RECEIVER

BACKGROUND OF THE INVENTION

This invention relates to a cassette tape player combined with a radio receiver, which is constituted by incorporating both a tape player working with a cassette tape and a radio receiver in a single electronic apparatus.

There has been proposed a cassette tape player combined with a radio receiver, which contains a tape playing mechanism operating as a cassette tape player and a radio signal receiving device functioning as a usual radio receiver which are combined in a single electronic apparatus which is miniaturized so as to be handy to carry. In such a cassette tape player combined with a radio receiver proposed previously, a plurality of player control buttons used for selecting an operation of the tape playing mechanism, for example, a forward button (FWD button) used for making a normal reproducing operation mode, a fast-forward button (FF button) used for making a fast-forwarding operation mode, a rewinding button (REW button) used for making a rewinding operation mode and a stop button used for releasing each of the above-mentioned buttons from their operating states, a radio control button used for causing the radio signal receiving device to be operative or inoperative, and a selecting button used for selecting a condition in which the tape playing mechanism can be operative or a condition in which the radio signal receiving device can be operative are provided, and the selection by the selecting button must be carried out when the tape playing mechanism or the radio signal receiving device is caused to be operative. Accordingly, on the occasion of a switchover of the condition in which the radio signal receiving device is operative to the condition in which the tape playing mechanism is operative, it is required to take in order the steps for making the radio signal receiving device inoperative by manipulating the radio control button, for selecting the condition in which the tape playing mechanism can be operative by manipulating the selecting button and for controlling the tape playing mechanism by manipulating the player control buttons, and also on the occasion of the switchover of the condition when the tape playing mechanism is operative to the condition when the radio signal receiving device is operative, it is required to take in order the steps for making the tape playing mechanism inoperative by manipulating the stop button, for selecting the condition in which the radio signal receiving device can be operative by manipulating the selecting button and for making the radio signal receiving device operative by manipulating the radio control button.

As mentioned above, when the cassette tape player combined with the radio receiver proposed previously is changed so that the condition in which the radio signal receiving device is operative is switched to the condition in which the tape playing mechanism is operative or vice versa, the selection by the selecting button is always required and this makes the operation of the previously proposed player troublesome.

OBJECTS AND SUMMARY OF THE INVENTION

Accordingly, it is an object of the present invention to provide a cassette tape player combined with a radio receiver, which avoids the foregoing disadvantage of the prior art.

Another object of the present invention is to provide a cassette tape player combined with a radio receiver, which contains a tape playing mechanism operating as a cassette tape player and a radio signal receiving device functioning as a radio receiver, and in which the switchover between a condition wherein the tape playing mechanism is operative and a condition wherein the radio signal receiving device is operative can be performed without a specific manipulation of a selecting button or the like.

A further object of the present invention is to provide a cassette tape player combined with a radio receiver, which contains a tape playing mechanism operating as a cassette tape player and a radio signal receiving device functioning as a radio receiver which does not have a selecting button or the like specifically provided to be used to switch from a condition wherein the tape playing mechanism can be operative to a condition wherein the radio signal receiving device can be operative, or vice versa.

According to an aspect of the present invention, there is provided a cassette tape player combined with a radio receiver comprising a tape playing mechanism operating as a cassette tape player, a radio signal receiving device functioning as a radio receiver, a plurality of player control buttons used for selecting an operation mode of the tape playing mechanism, a radio control button used for causing the radio signal receiving device to be operative, and a stop button used to stop either the tape playing mechanism or the radio signal receiving device from operating, wherein the switchover between two of the player control buttons or radio control button can be carried out and the operating condition of either the tape playing mechanism or the radio signal receiving device can be directly released by manipulating the stop button.

With the cassette tape player combined with a radio receiver thus constituted in accordance with the present invention, the switchover between the normal reproducing operation mode of the tape playing mechanism and the operating condition of the radio signal receiving device can be directly carried out by manipulating the radio control button or one of the player control buttons such as a FWD button, and moreover, the switchover between the normal reproducing operation mode the, fast-forwarding operation mode or rewinding opeartion mode of the tape playing mechanism or the operating condition of the radio signal receiving device can be directly carried out by manipulating a control button corresponding to an operation mode or operating condition which is selected. Further, the operation mode or operating condition selected by manipulating the control button corresponding thereto can be directly released by manipulating the stop button. Accordingly, the cassette tape player combined with a radio receiver according to the present invention does not require any troublesome manipulation of the control buttons for operation and it is very convenient to use.

The above and other objects, features and advantages of the present invention will become apparent from the following detailed description thereof taken in conjunction with the accompanying drawings.

BRIEF DESCRIPTION OF THE DRAWINGS

FIG. 4 is an exploded view in perspective of a stop button assembly employed in the embodiment shown in FIG. 1;

FIG. 5 is an exploded view in perspective of a FF button or REW button assembly employed in the embodiment shown in FIG. 1;

DESCRIPTION OF A PREFERRED EMBODIMENT

Now, an embodiment of cassette tape player combined with a radio receiver will be explained with reference to the drawings hereinafter.

Figure 1:
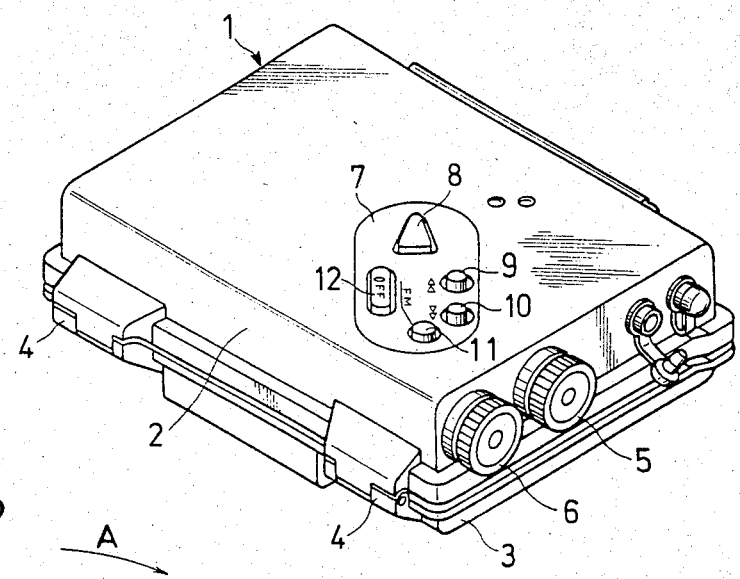
FIG. 1 is a perspective view showing the exterior of one embodiment of cassette tape player combined with a radio receiver according to the present invention.

FIG. 1 shows the exterior of one example of a cassette tape player combined with a radio receiver according to the present invention. This example has a cabinet 1 of small size in which a tape playing mechanism operating as a cassette tape player and a radio signal receiving device functioning as a usual radio receiver are contained. The cabinet 1 is divided into a body member 2 which contains a major part of the tape playing mechanism and the radio signal receiving device, and a lid member 3 which is provided with a cassette holder and engaged through a hinge portion 4 with the body member 2 so as to be opened and closed relative to the body member 2. At the side wall of the body member 2, a channel selecting button 5 is connected with the radio signal receiving device and a volume control button 6 is connected with both the tape playing mechanism and the radio signal receiving device. Further, the flat plane portion of the body member 2 is provided with a control panel 7 which has a FWD button control portion 8, a FF button control portion 9 and a REW button control portion 10 located at positions corresponding to the tops of a FWD button, a FF button and a REW button, which are tape player control buttons used for selecting an operation mode of the tape playing mechanism, respectively, a radio button control portion 11 located at a position corresponding to the top of a radio control button used for causing the radio signal receiving device operative, and a stop button control portion 12 located at a position corresponding to the top of the stop button used for release of the operation mode or operating state selectively by manipulating the FWD button, FF button, REW button or radio control button. When one of the FWD button, FF button, REW button or radio control button is pushed down through the corresponding one of the FWD button control portion 8, FF button control portion 9, REW button control portion 10 and radio button control portion 11, it is maintained in the pushed down state to command the respective operation mode or operating condition, and when the stop button is pushed down through the stop button control portion 12, the operation mode or operating condition caused by pushing down the selected one of the FWD button, FF button, REW button and radio control button is released. In such a case, the switchover between each two of the FWD button, FF button, REW button and radio control button is directly carried out. That is, when one of the FWD button, FF button, REW button or radio control button is newly pushed down in the condition under which another of the FWD button, FF button, REW button and radio control button has been in the pushed down state, and button in the pushed down state is caused to return to its normal position and the newly pushed down button remains in the pushed down state. Accordingly, the mutual switchover between each two of the respective operation mode and operating condition selectively caused by pushing down the FWD button, FF button, REW button or radio control button is directly carried out. Further, when the stop button is pushed down, any one of the FWD button, FF button, REW button and radio control button, which has been held in the pushed down state, is caused directly to return to its normal position and the operation mode or operating condition associated with the pushed down button is directly released.

Figure 2:
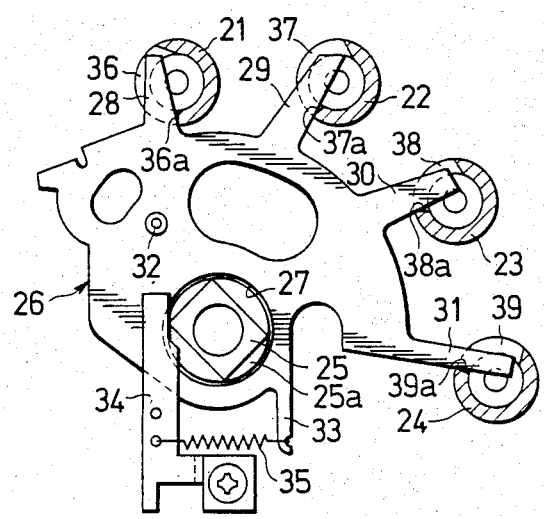
FIG. 2 is a plane view including partial sections showing a selecting and releasing structure employed in the embodiment shown in FIG. 1.
Figure 3:
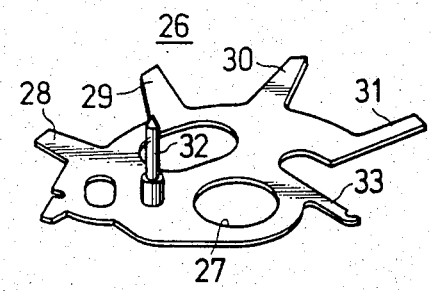
FIG. 3 is a perspective view showing a locking plate member used in the structure shown in FIG. 2.

A selecting and releasing structure including the FWD button, FF button, REW button, radio control button or stop button which are to be manipulated as mentioned above will be described hereinafter. As shown in FIG. 2, tubular bosses 21, 22, 23, 24 and 25 which are used for holding the FWD button, FF button, REW button, radio control button and stop button, respectively, are provided on a chassis contained in the body member 2 of the cabinet 1, and a locking plate member 26 is placed to surround the tubular boss 25. The locking plate member 26 is made of, for example, metal and has an opening 27 and four arms 28, 29, 30 and 31 which extend radially, as shown in FIG. 3. A pin 32 is mounted on one surface of the locking plate member 26 and a projection 33 is provided near the opening 27. The locking plate member 26 is attached so that the opening 27 fits with a base 25a of the tubular boss 25 and is forced by a spring 35 provided between a spring holder 34 fixed to the chassis and the projection 33 so as to cause it to rotate in the direction indicated by an arrow A in FIG. 2. In the condition shown in FIG. 2, the arms 28, 29, 30 and 31 engaged with respectively cut ends 36a, 37a, 38a and 39a forming cutout portions 36, 37, 38 and 39 provided on the tubular bosses 21, 22, 23 and 24, respectively, so as to hold the whole locking plate member 26 in a stationary state.

As shown in FIG. 4, an engaging portion 42 of a stop button 41 is inserted in an inner space 40 of the tubular boss 25 together with a coil spring 43 and the engaging portion 42 which is held in the inner space 40 so that the stop button 41 is held by the tubular boss 25. The stop button 41 is biased by the coil spring 43 to tend to get out of the inner space 40 of the tubular boss 25. Accordingly, the stop button 41 can be shifted downwardly into the inner space 40 against the coil spring 43 when the top 44 is pushed down, and will returned to the original position when the force pushing down the top 44 is removed. Further, the stop button 41 is provided with an engaging member 46 which has a slant portion 45.

As shown in FIG. 5, an engaging portion 49 of a FF button 48 is inserted in an inner space 47 of the tubular boss 22 together with a coil spring 50. A projection 51 extending from the engaging portion 49 in the direction of the axis thereof is inserted into a small hole 52 which is provided at the end of the inner space 47 and another engaging portion 53 extends from the engaging portion 49 in the direction perpendicular to the direction of the projection 51 is received into a slit portion 54 provided on the tubular boss 22 so that the FF button 48 is held by the tubular boss 22. Although the FF button 48 is biased by the coil spring 50 to tend to move out of the inner space 47 of the tubular boss 22, the engaging portion 53 of the FF button 48 is caught by points 55 projecting from the slit portion 54 at the opening end of the tubular boss 22 and therefore the FF button 48 is prevented leaving from the tubular boss 22. The FF button 48 can be shifted downward along the inner space 47 against the coil spring 50 when a top 56 thereof is pushed down, and is returned by the coil spring 50 to the original position where the engaging portion 53 is caught by the points 55 when the force pushing down the top 56 is removed. The projection 51 provided for the FF button 48 has a conical end 57 and a loop groove 58. Further, the end of the engaging portion 53 of the FF button 48 engages with another structural member provided for making the tape playing mechanism operate in the fast-forward operation mode.

The tubular boss 23 is formed in the same shape as the tubular boss 22 and a REW button 59 is held by the tubular boss 23. The REW button 59 is formed in the same shape as the FF button 48 and is placed in the tubular boss 23 in the same manner as the FF button 48 is placed in the tubular boss 22. Accordingly, the REW button 59 can be shifted downward when a top 60 thereof is pushed down. The REW button 59 is also provided with a projection 61 corresponding to the projection 51 of the FF button 48 and has a conical end 62 and a loop groove 63. An engaging portion 64 of the REW button 59 which corresponds to the engaging portion 53 of the FF button 48 engages with other structural members provided for making the tape playing mechanism operate in the rewinding operation mode.

Figure 6:
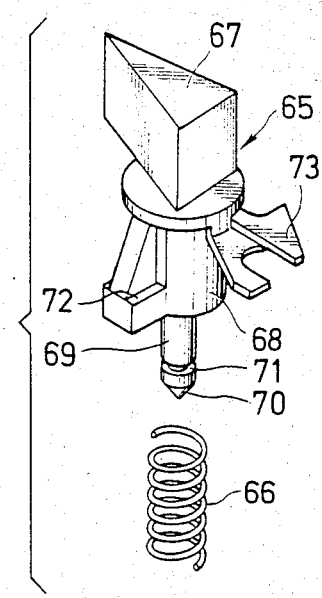
FIG. 6 is an exploded view in perspective of a FWD button assembly employed in the embodiment shown in FIG. 1.

Each of the tubular bosses 21 and 24 is also formed in the same shape as the tubular boss 22. A FWD button 65 as shown in FIG. 6 is held by the tubular boss 21 together with a coil spring 66 in the same manner as the FF button 48 held by the tubular boss 22, so that the FWD button 65 is forced by the coil spring 66 to bias it out of the tubular boss 21. Accordingly, the FWD button 65 can be shifted downward against the coil spring 66 when a top 67 thereof is pushed down and is returned to the original position when the force pushing down the top 67 is removed. The FWD button 65 is also provided with an engaging portion 68 which has a projection 69 which extends therefrom and has a conical end 70 and a loop groove 71. In addition to an engaging portion 72 provided for preventing the FWD button 65 from going out of the tubular boss 21, a further engaging portion 73 extends from the FWD button 65 to engage with another structural member provided for making the tape playing mechanism operate in the normal reproducing operation mode.

Figure 7:
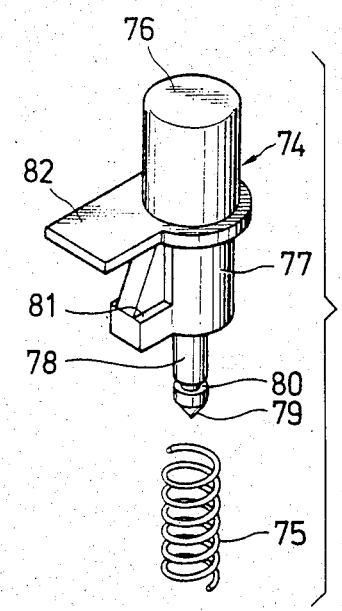
FIG. 7 is an exploded view in perspective of a radio control button assembly employed in the embodiment shown in FIG. 1.

Further, a radio control button 74 as shown in FIG. 7 is held by the tubular boss 24 together with a coil spring 75 in the same manner as the FF button 48 held by the tubular boss 22, so that the radio control button 74 is forced by the coil spring 75 to bias it out of the tubular boss 24. Accordingly, the radio control button 74 can be shifted downward against the coil spring 75 when a top 76 thereof is pushed down and is returned to the original position when the force pushing down the top 76 is removed. The radio control button 74 is provided with an engaging portion 77 which has a projection 78 extending therefrom and has a conical end 79 and a loop groove 80. Moreover, in addition to an engaging portion 81 provided for preventing the radio control button 74 from going out of the tubular 24, an engaging plate 82 extends from the radio control button 74 and engages with another structural member provided for making the radio signal receiving device operative.

As described above, a stop button assembly containing the stop button 41 as shown in FIG. 4, FF and REW button assemblies containing the FF and REW buttons 49 and 59, respectively, as shown in FIG. 5, a FWD button assembly containing the FWD button 65 as shown in FIG. 6 and a radio control button assembly containing the radio control button 74 as shown in FIG. 7 are provided to form the selecting and releaseing structure in cooperation with the locking plate member 26.

Figure 8:
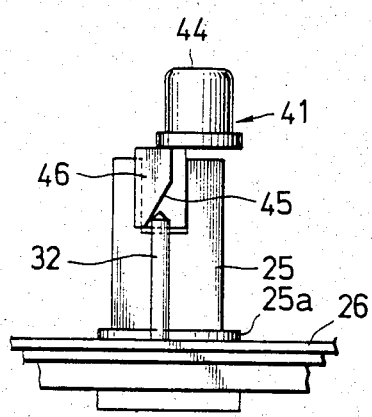
FIG. 8 is a side view of the stop button assembly set in the embodiment shown in FIG. 1.

FIG. 8 shows the stop button assembly in which the stop button 41 is held by the tubular boss 25. The stop button 41 is set so that the slant portion 45 of the engaging member 46 is positioned to face to the top of the pin 32 planted on the locking plate member 26 when the top 44 of the stop button 41 is not pushed down.

Figure 9:
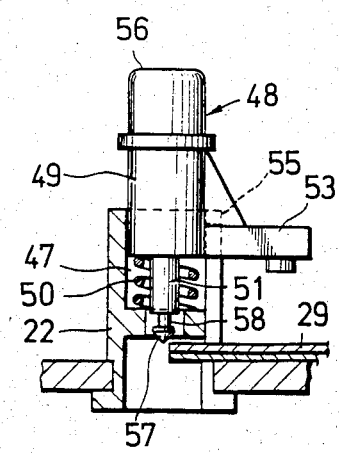
FIG. 9 is a side view including partial sections of the FF button assembly set in the embodiment shown in FIG. 1.

FIG. 9 shows the FF button assembly in which the FF button 48 is held by the tubular boss 22, by way of example, of one of the FF button, REW button, FWD button and radio control button assemblies. The FF button 48 is pushed up by the coil spring 50 so that the conical end 57 of the projection 51 is positioned above the end of the arm 29 of the locking plate member 26 residing in the tubular boss 22.

Figure 10:
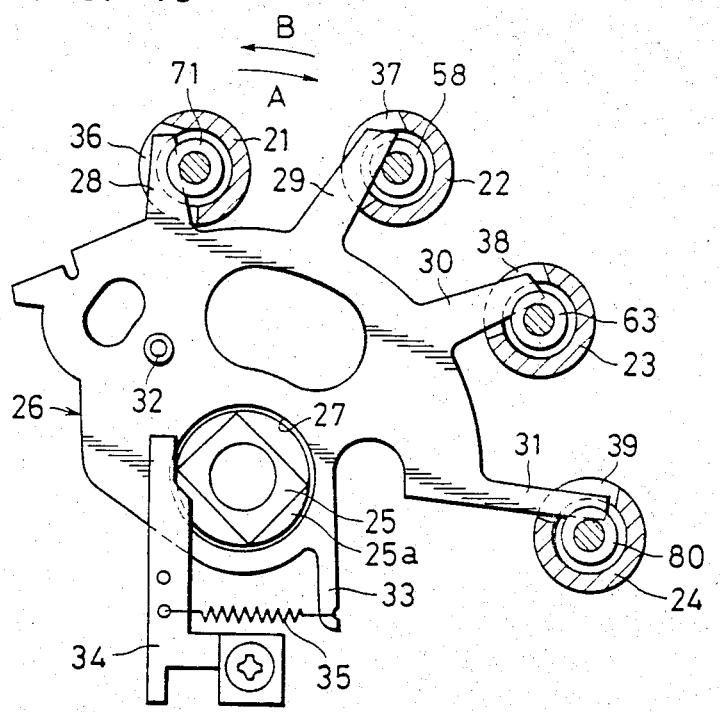
FIGS. 10 and 11 are a plane view including partial sections of the selecting and releasing structure and a fragmental section of a portion of the selecting and releasing structure, respectively, used for explaining the operation of the selecting and releasing structure.
Figure 11:
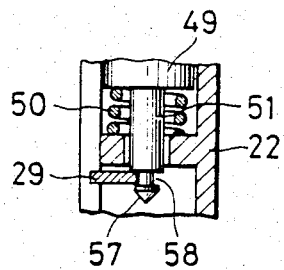

FIG. 10 shows the situation in which the FWD button 65, FF button 48, REW button 59 and radio control button 74 are attached to the tubular bosses 21, 22, 23 and 24, respectively. In FIG. 10, the FWD button 65 and the tubular boss 21 are shown with sections appearing in the plane at the loop groove 71 of the FWD button 65, the FF button 48 and the tubular boss 22 with a section appearing in the plane at the loop groove 58 of the FF button 48, the REW button 59 and the tubular boss 23 with a section appearing in the plane at the loop groove 63 of the REW button 59, and the radio control button 74 and the tubular boss 24 with sections appearing in the plane at the loop groove 80 of the radio control button 74. In this situation, the respective ends of the arms 28, 30 and 31 residing in the cutout portions 36, 38 and 39 of the tubular boss 21, 23 and 24 are positioned under the conical end 70 of the projection 69 of the FWD button 65, the conical end 62 of the projection 61 of the REW button 59, and the conical end 79 of the projection 78 of the radio control button 74, respectively. On the other hand, the end of the arm 29 residing in the cutout portion 37 of the tubular boss 22 engages with the loop groove 58 formed on the projection 51 provided in the FF button 48, as shown in FIG. 11. That is, only the FF button 48 is kept in the pushed down position. Such a state is obtained by merely pushing down the top 56 of the FF button 48. When a force pushes down the top 56 of the FF button 48 the conical end 57 of the projection 51 provided for the FF button 48 comes into contact with the end of the arm 29 of the locking plate member 26 to push the same in the direction indicated by an arrow B in FIG. 10 as the FF button 48 is pushed down more, so that the locking plate member 26 is rotated around the tubular boss 25 in the direction of the arrow B. After that, when the FF button 48 is pushed down further, the end of the arm 29 moves out of the conical end 57 of the projection 51, so that the locking plate member 26 is rotated by the spring 35 in the direction indicated with an arrow A in FIG. 10 and the end of the arm 29 engages with the loop groove 58 of the FF button 48. Consequently, the FF button 48 is kept in the pushed down position after the force pushing down the top 56 thereof is removed, and the tape playing mechanism is made to operate in the fast-forwarding operation mode.

In such a situation as shown in FIG. 10, when the top 67 of the FWD button 65 is pushed down, for example, the conical end 70 of the projection 69 provided on the FWD button 65 is moved downward to push the arm 28 of the locking plate member 26 in the direction of the arrow B so as to rotate the locking plate member 26 around the tubular boss 25 in the direction of the arrow B. Accordingly, the end of the arm 29 of the locking plate member 26 moves out of the loop groove 58 of the FF button 48 and the FF button 48 is pushed up by the coil spring 50 to return it to the original position. Then, the end of the arm 28 moves out of the conical end 70 of the projection 69, so that the locking plate member 26 is rotated by the spring 35 in the direction of the arrow A and the end of the arm 28 engages with the loop groove 71 of the FWD button 65. Consequently, the FWD button 65 is kept in the pushed down position after the force pushing down the top 67 is removed. In a manner such as described above, the switchover from the condition in which the FF button 48 is kept in the pushed down position to the condition in which the FWD button 65 is kept in the pushed down position is directly carried out, so that the operation mode of the tape playing mechanism is directly switched to the normal reproducing operation mode from the fast-forwarding operation mode. The similar direct switchover is also carried out when the REW button 59 or the radio control button 74 is pushed down, and the arm 30 or 31 of the locking plate member 26 engages with the loop groove 63 or 80 so as to keep the REW button 59 or the radio control button 74 in the pushed down position, so that the tape playing mechanism is directly turned to operate in the rewinding operation mode or the redio signal receiving device is directly turned and causes the radio to be operative. Accordingly, whenever one of the FWD button 65, FF button 48, REW button 59 and radio control button 74 is pushed down under the situation in which another of them is kept in the pushed down position, the locking plate member 26 is rotated so that the newly pushed down button is kept in the pushed down position and another button having been kept in the pushed down position is returned.

Meanwhile, when the top 44 of the stop button 41 is pushed down, the slant portion 45 of the engaging member 46 of the stop button 41 comes into contact with the top of the pin 32 planted on the locking plate member 26 to push the same in the direction perpendicular to the direction of the force pushing down the top 44 of the stop button 41, so that the locking plate member 26 is rotated around the tubular boss 25 in the direction of the arrow B shown in FIG. 10. The arms 28, 29, 30 and 31 of the locking plate member 26 are moved also in the direction of the arrow B, so that any one of them which is engaged with the corresponding one of the loop grooves 71, 58, 63 and 80 is released from the engagement, and therefore any one of the FWD button 65, FF button 48, REW button 59 and radio control button 74 which has been held in the pushed down position is returned to the original position. As a result of this, the operation mode of the tape playing mechanism or the operating condition of the radio signal receiving device taken selectively in response to the manipulation of one of the FWD button 65, FF button 48, REW button 59 and radio control button 74 is directly released by pushing down the stop button 41. The stop button 41 returns by itself to the original position when the force pushing down the top 44 of thereof is removed.

Figure 12:
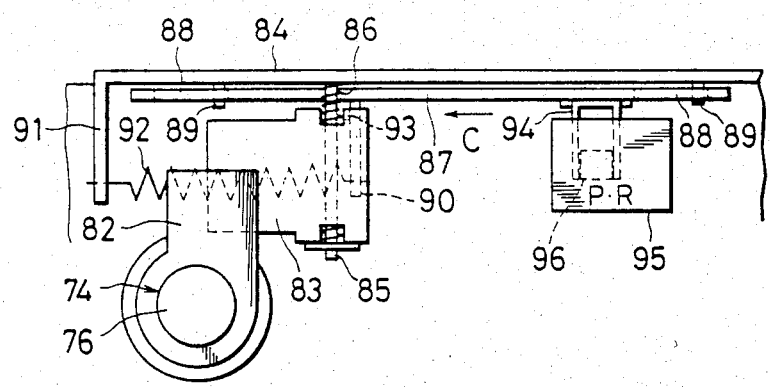
FIGS. 12 and 13 are plane and side views, respectively, of a switching structure engaged with the radio button in the embodiment shown in FIG. 1.
Figure 13:
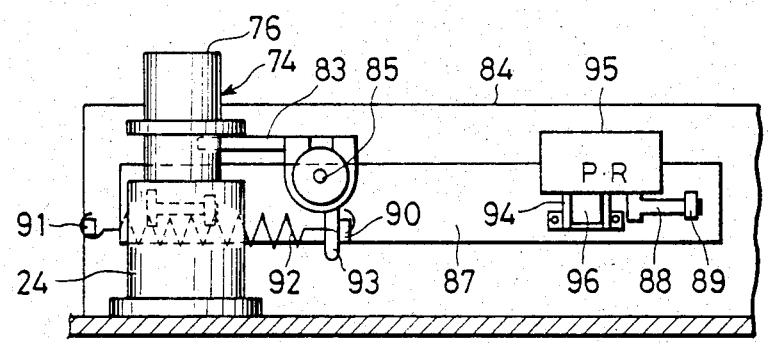
Figure 14:
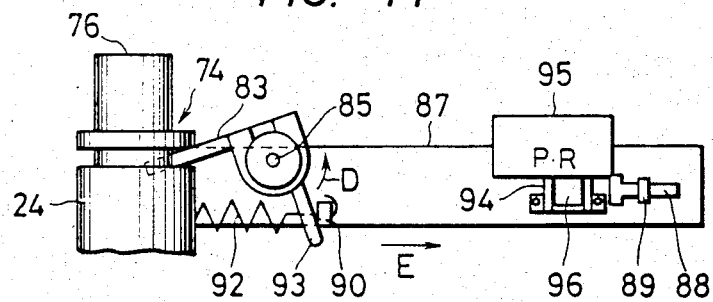
FIG. 14 is a partial side view of the structure shown in FIGS. 12 and 13 used for explaining the operation thereof.

Now, a switching structure engaging with the radio control button 74 will be described with reference to FIGS. 12, 13 and 14. As shown in FIGS. 12 and 13, the engaging plate 82 extending from the radio control button 74 engages with a rotatable plate member 83. The rotatable plate member 83 is held by a shaft 85 fixed on a supporting plate member 84 is attached to the chassis and is forced by a spring 86 to rotate around the shaft 85. A sliding plate 87 is held by the supporting plate member 84 so that guide pins 89 projecting from the supporting plate member 84 are inserted into guide openings 88 provided on the sliding plate 87, and are forced by a spring 92 provided between a projection 90 of the sliding plate 87 and a spring holder 91 extending from the supporting plate member 84 to tend to move in the direction indicated with an arrow C shown in FIG. 12. The projection 90 engages an engaging portion 93 extending from the rotatable plate member 83. The sliding plate 87 is provided with a holding member 94 which holds a control projection 96 of a player/radio selecting swith 95. The player/radio selecting switch 95 is formed with a slide switch and the control projection 96 thereof takes selectively positions P and R as shown in FIGS. 12, 13 and 14. When the control projection 96 of the player/radio selecting switch 95 takes the position P, the tape playing mechanism can be made operative and when the control projection 96 takes the position R, the radio signal receiving device is caused to operate.

In such a configuration, it is arranged that the sliding plate 87 is so positioned so that the control projection 96 of the player/radio selecting switch 95 held by the holding member 94 takes the position P when the radio control button 74 is not pushed down, as shown in FIG. 13. Accordingly, when the radio control button 74 is not pushed down, the tape playing mechanism can be made operative. When the radio control button 74 is pushed down, as shown in FIG. 14, the engaging plate 82 extending from the radio control button 74 rotates the rotatable plate member 83 in the direction indicated with an arrow D, so that the engaging portion 93 extending from the rotatable plate member 83 is moved to push the projection 90 of the sliding plate 87 in the direction indicated with an arrow E shown in FIG. 14 against the spring 92 and shifts the sliding plate 87 in the direction of the arrow E. As a result of this, the control projection 96 of the player/radio selecting switch 95 held by the holding member 94 is moved to take the position R and therefore the radio signal receiving device is made operative. The situation in which the control projection 96 of the player/radio selecting switch 95 takes the position R continues during a period in which the radio control button 74 is kept in the pushed down position, and when the radio control button 74 returns to the original position, the sliding plate 87 is shifted by the spring 92 in the direction opposite to the direction of the arrow E and the control projection 96 of the player/radio selecting switch 95 is returned to the position P. In such a manner as described above, the switchover between the operation mode of the tape player mechanism and the operating condition of the radio signal receiving device is substantially carried out by manipulating the radio control button 74.

In the embodiment aforementioned, during the period in which the radio control button 74 is kept in the pushed down position to make the radio signal receiving device operative, as shown in FIG. 14, the tape playing mechanism is not supplied with a operation voltage so that a motor contained therein does not rotate. Accordingly, in the case where the radio control button 74 and one of the FWD button 65, FF button 48 and REW button 59 are pushed down simultaneously, only the radio signal receiving device is made operative and consequently a disadvantage such that noise generated by the motor in the tape playing mechanism is contained in the output of the radio signal receiving device is avoided.

What is claimed is:

1. A locking and releasing mechanism for a cassette tape player combined with a radio receiver comprising;
   a tape playing mechanism operating as a cassette tape player,
   a radio signal receiving device functioning a radio receiver,
   a plurality of player control buttons connected with said tape playing mechanism to be used for selecting an operation mode of said tape playing mechanism,
   a radio control button connected with said radio signal receiving device to be used for causing the radio signal receiving device to be operative,
   a stop button provided in common to both the tape playing mechanism and the radio signal receiving device to be used for stopping either one of said tape playing mechanism and said radio signal receiving device from operating, and
   a locking and releasing structure which is fitted to be rotatable against a boss on a chassis and having a first portion including a plurality of arms extending radially which engages with one of said player control buttons and a radio control button to be kept in the manipulated and a second portion which engages with said stop button to release one of said player control buttons and radio control button to be kept in the manipulated,
   said locking and releasing structure is operative to keep said radio control button in the manipulated position and directly release one of said player control buttons without operating said stop button from the manipulated position when said radio control button is manipulated under the situation in which said one of said player control buttons has been kept in the manipulated position, and (said locking and releasing structure) is also operative to keep one of said player control buttons in the manipulated position and directly release radio control button without operating said stop button from the manipulated position when one of said player control buttons is manipulated under the situation in which said radio control button has been kept in the manipulated position.

2. A locking and releasing mechanism for a cassette tape player combined with a radio receiver according to claim 1, wherein each of said player control buttons, radio control button and stop button is provided in the form of a push button and is pushed in parallel with the extending direction of said boss.

3. A locking and releasing mechanism for a cassette tape player combined with radio receiver according to claim 1 or 2, wherein said second portion is including a pin and is provided with said selecting and releasing in parallel with the extending direction of said boss.

4. A locking and releasing mechanism for a cassette tape player combined with radio receiver according to claim 1, wherein said boss is including a tubular boss and said holds stop button.

5. A locking and releasing mechanism for a cassette tape player combined with a radio receiver according to claim 1, wherein said radio control button is engaging with a switching structure for controlling player/radio selecting switch provided to make selectively a first condition in which said tape player mechanism is able to be operative and a second condition i which said radio signal receiving device is operative.

* * * * *